C. B. KURTZ.
TRANSMISSION MECHANISM.
APPLICATION FILED NOV. 21, 1917.
1,378,470.
Patented May 17, 1921.
2 SHEETS—SHEET 1.
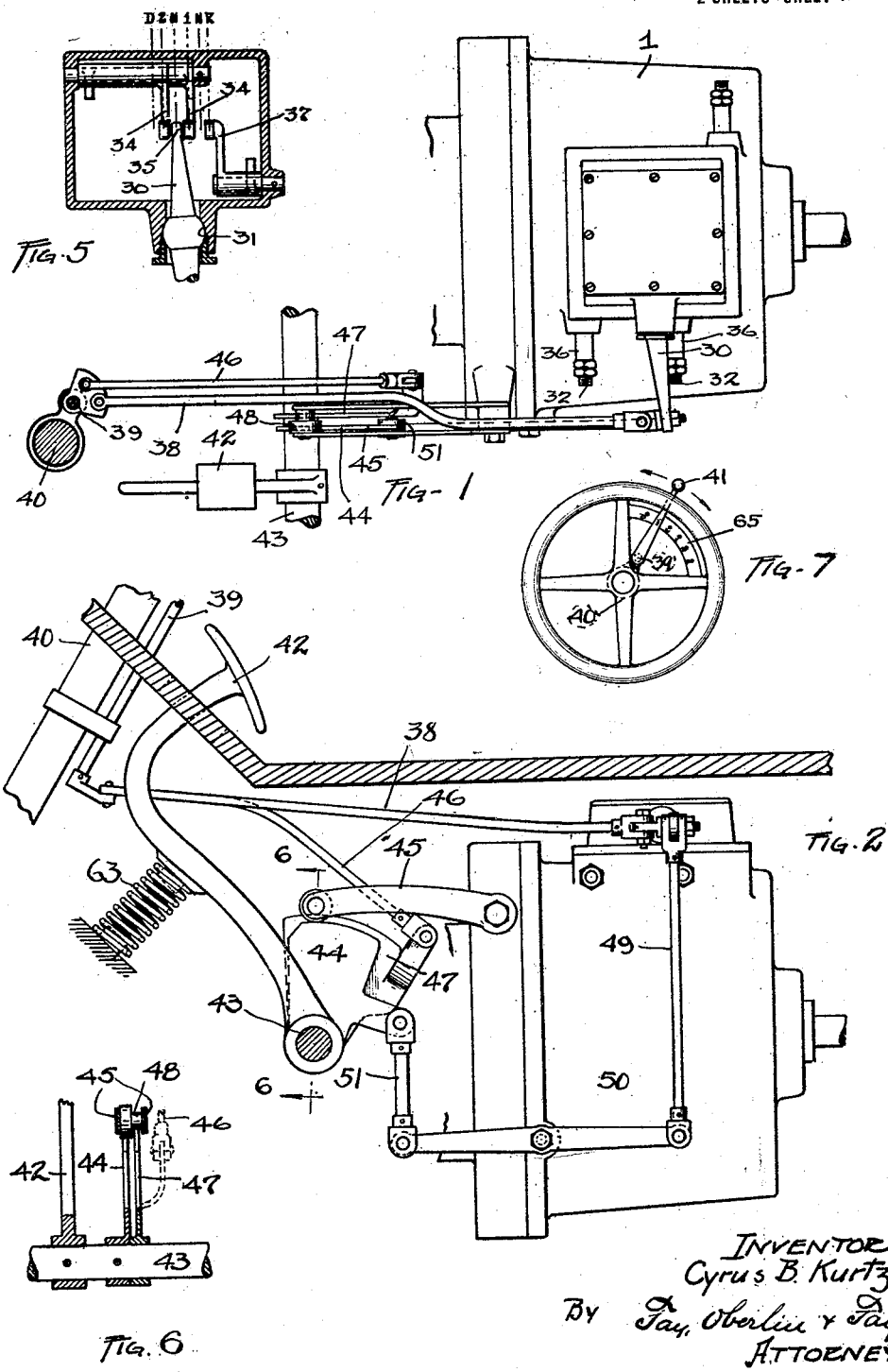
INVENTOR
Cyrus B. Kurtz
By Jay, Oberlin & Jay
ATTORNEYS C. B. KURTZ.
TRANSMISSION MECHANISM.
APPLICATION FILED NOV. 21, 1917.
1,378,470.
Patented May 17, 1921.
2 SHEETS—SHEET 2.
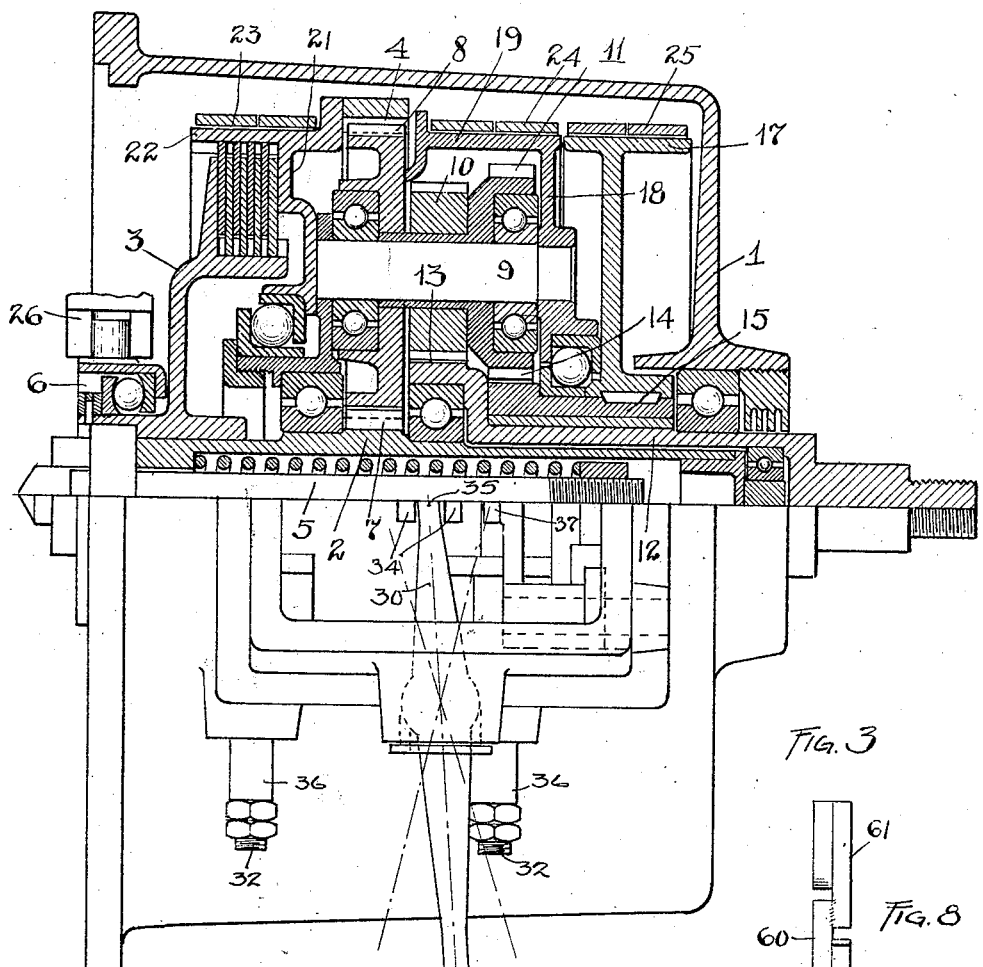
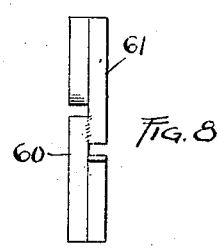
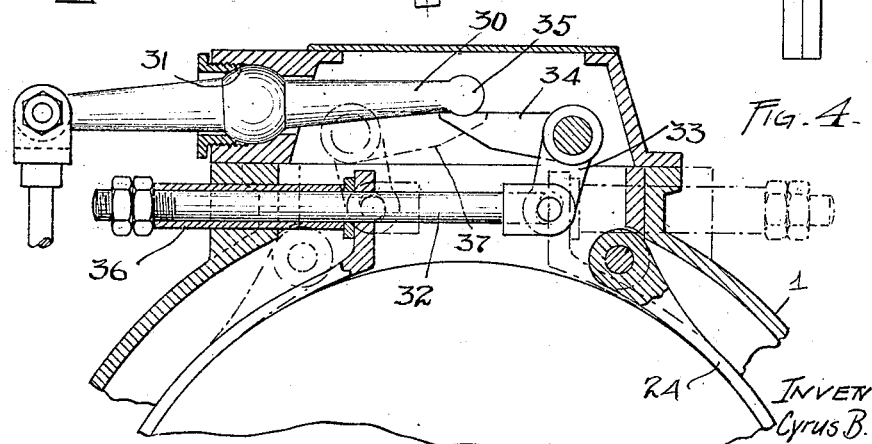
INVENTOR
Cyrus B. Kurtz.
By Fay, Oberlin & Fay ATT'YS

UNITED STATES PATENT OFFICE.

CYRUS B. KURTZ, OF LAKEWOOD, OHIO.

TRANSMISSION MECHANISM.

1,378,470.  Specification of Letters Patent.  Patented May 17, 1921.

Application filed November 21, 1917.  Serial No. 203,102.

*To all whom it may concern:*

Be it known that I, CYRUS B. KURTZ, a citizen of the United States, and a resident of Lakewood, county of Cuyahoga, and State of Ohio, have invented a new and useful Improvement in Transmission Mechanism, of which the following is a specification, the principle of the invention being herein explained and the best mode in which I have contemplated applying that principle, so as to distinguish it from other inventions.

The present invention, relating, as indicated to transmission mechanism, is particularly concerned with an improved type of transmission adapted to transmit power between two shafts at various relations of speed and torque. A further object of the invention is a provision of controlling means for operating such a transmission which are extremely simple in construction and in operation. A still further object of the invention is the provision of an interlocking mechanism which effectively prevents the engagement of more than one set of driving connections at any one time. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Figure 1 is a plan view of my invention as applied to an automobile; Fig. 2 is an elevation of the mechanism as illustrated in Fig. 1; Fig. 3 illustrates the transmission means partly in section and partly a top plan view of the transmission box with the cover removed from the central box; Fig. 4 is a vertical section through the upper part of the transmission case and the control box; Fig. 5 is a horizontal section through the control box illustrating the disposition of the operating means in same; Fig. 6 is a sectional view on the line 6—6, Fig. 2; Fig. 7 is a plan view of the steering wheel showing the means for operating my transmission mounted on same; and Fig. 8 is a plan view of a preferred form of clutch band.

The general construction of my device can best be seen in Figs. 1, 2 and 3, in which is shown a transmission case 1 in which is disposed my transmission mechanism proper. Disposed horizontally within the casing 1 and in axial relation thereto is a tubular shaft 2 adapted to be driven direct from the crank shaft of an engine, which is not shown. Mounted adjacent to one end of the shaft 2 and adapted to rotate therewith, is one member of a disk clutch 3 normally held in driving engagement with an internal gear 4, by means of a spring-pressed plunger 5 in the tubular shaft 2.

A clutch operating means 6 is provided for disengaging the disk clutch 3, the operation of which will be more fully described later.

The shaft 2 has mounted thereon, or formed integral therewith, a gear 7 which is engaged by a pair of gears 8 positioned diametrically opposite to each other and adapted to engage both the gear 7 and the internal gear 4. Stub or planet shafts 9 are provided on which are revolubly mounted the gears 8, and also two other sets of gears 10 and 11. The gears 8, 10 and 11 are keyed or otherwise interconnected and rotate in unison in bearings 9ª on the shaft 9.

Surrounding the shaft 2, and rotatably mounted thereon, is a shaft 12, on the inner end of which is a gear 13 adapted to engage the pair of gears 10 on the shafts 9. Engaging the gears 11 is a gear 14 integral with a sleeve 15 which is rotatably mounted on the shaft 12. The sleeve 15 is nonrotatably connected with an enlarged brake drum surface 17 concentric with the shafts 2 and 12. The stub shafts 9 are secured at their ends in a casing member 18, the outer portion of which, 19, is a drum also formed concentric with the shafts 2 and 12, and in substantial alinement with the drum 17. Similarly the driven member of the disk clutch 3, which driven member consists of the disks shown in Fig. 1, and the support therefor, 21, is formed with a drum surface 22 and associated with the drums 22, 19 and 17 are normally spaced gripping brake bands 23, 24 and 25 respectively, which may be operated to grip and hold against movement any one of these three drums through controlling means which will be described hereinafter.

As already stated the clutch 3 is normally held in engagement by means of the spring pressed plunger 5 and when so engaged the driving shaft 2 is directly coupled to the driven shaft 12. Under the circumstances the drums 22, 19 and 17, the stub shafts 9 and the gears 4, 7, 8, 10, 11, 13, and 14 rotate about the axis of the shaft 2 as a unit and constitute a revolving weight of sufficient amount to operate as a fly wheel to absorb the individual impulses of the engine and to maintain a constant torque on the driven shaft 12. There is no relative movement between the gear teeth and consequently the noise which would be created by such movement does not occur.

In order to engage a lower speed than the direct driven speed it is necessary to disconnect the direct drive clutch 3, which is accomplished by moving forward, that is to the left, as shown in Fig. 3, a collar the clutch shifter 26, which acts to move forward the member 3 and to disengage the interlocking disks of the disk clutch. The band or brake 23 is then engaged by means, which will be presently described, to hold non-rotatably the drum 21 and hence the internal gear 4. The continued rotation of the gear 7 on the driving shaft 2 will then rotate the clusters of gears 8, 10 and 11, together with the shafts 9 and the housing 18 forward in the same direction as the gear 7 is rotated about the axis of the shaft 2 since the gear 8 can only revolve on its own axis by moving in such a direction owing to its engagement with the stationary gear 4. This action of the gear 8 will revolve the gear 10 in the same direction and will transmit this movement to the driven shaft 12 through the gear 13. This gear connection between the shafts 2 and 12 develops the intermediate speed which is secured without an extremely rapid movement of the gear 8 and hence without appreciable noise or vibration.

Another driving ratio is secured between the driving and driven shafts when the brake bands 23 and 25 are released from their respective drums and the brake band 24 is operated to hold stationary the drum or carrier 19 and the casing, in which the ends of the stub shaft 9 are carried. When this is done the internal gear 4 is free to operate and to thus permit the gear 8 to revolve on its axis under the influence of the driving gear 7. Gears 8, 10 and 11 are thus revolved on their common axis, the shaft 9 and the gear 10 drive the gear 13 at a speed determined by the relative number of teeth in the gears 7 and 8, and 10 and 13. The relative driving ratios between these two low speeds can be readily changed by varying the number of teeth on the gears 7, 8, 4, 10 and 13, as will be apparent from the drawings.

A reverse rotation of the driven shaft is secured by freeing the brake bands 23 and 24, which is their normal condition, and by engaging the brake band 25 with the drum 17 which is keyed to the shaft 15 to revolve the internal gear 14 in mesh with the gear 11 of the cluster of gears 8, 10 and 11, which rotates on the stub shaft 9, the gear 14 being held stationary, the cluster of gears will be rotated about the axis of the shaft 9, and will also revolve about but in the reverse direction from the shaft 2. The driven shaft 12 will consequently be rotated also in the reverse direction.

The means for actuating the brake bands 23, 24 and 25 are shown in Figs. 4, 5, and 6 and consist primarily of a pivoted lever 30 constituting a brake-actuating and selector member which is mounted to rock in both a horizontal and a vertical plane by being provided between its ends with a ball or spherical portion 31 pivoted in a suitable socket formed in an extension of the inclosing casing 1. Each of the brake bands 23, 24 and 25 has one end fixed to a suitable support such as a rod 25$^a$ within the casing 1, as shown in Fig. 4, and has its other or free end adjustably mounted on a rod 32 connected to one end of a bell crank lever 33, the other end of which, 34, is positioned adjacent to the inner end 35 of the lever 30. Adjustably mounted on the rods 32 are sleeves 36, the position of which may be varied to take up any slack in the clutches 23, 24 and 25.

In Fig. 4 the position of the bands 23 and 24 is shown in full lines, while the position of the reverse band 25 and of the lever 37 for operating the same, are shown in dotted lines, the only difference between the forward and reverse bands being that the fixed and movable ends are reversed in position in order that the bands may exert their greatest holding effect in the direction to resist the normal rotation of their respective drums.

In Fig. 8 I have shown a plan view of a preferred type of band which I desire to use in the brakes 23, 24 and 25. In this figure the band is shown as consisting of two relatively narrow thin strips 60 and 61, the ends of which are placed in lateral contact and are welded firmly together. The free ends of the two strips 60 and 61 are thus brought parallel with each other and in alinement with the welded ends of the two bands so that the entire band passes around the drum twice, but takes up only the width of two bands and not of three bands, as would be the case if a single continuous strip were wrapped spirally around the drum.

The ends 34 and 37 of the bell crank levers controlling the movement of the bands 23, 24 and 25 are positioned adjacent to one another, as shown in Fig. 5, there being a sufficient space left between each two lever ends to receive therein the engaging end 35 of the operating lever 30 to select and operate one of the normally inoperative gearing connections between the driving shaft 2 and the driven shaft 12. The lever 30 is rocked in a horizontal plane until it is above the bell crank lever, which is connected to the brake band which is adapted to actuate the desired gear connection and then the lever 30 is rocked in a vertical plane until it contacts with, and moves downward, the selecting bell crank lever, thus causing the engagement of the selecting brake bands 23, 24 and 25, as the case may be. If the lever 30 is depressed between the ends of the bell cranks 34 and 37 no clutch band is engaged and these intermediate positions may therefore be considered as neutral points in the operation of the transmission.

The outer end of the lever 30 is connected by means of a rod 38 with a shaft 39 mounted adjacent and parallel to the steering column 40, this shaft terminating at its upper end in a controlling lever or indicator member 41, preferably positioned beneath the steering wheel 42. For convenience of illustration and description I am describing my improved transmission and control as applied to a vehicle, although it will be understood that the transmission is in no way limited to this use and numerous other uses will readily suggest themselves to those skilled in the various arts. Mounted adjacent to the steering column 40 is a clutch lever 42 provided with a foot pedal 42ª. The lever 42 is keyed or otherwise secured to a rock shaft 43, which has fixed upon it a cam 44. When the lever 42 is depressed the cam 44 lifts a lever 45 and thus actuates forward or to the left, as shown in Fig. 3, the clutch thrust collar 26, which disengages the direct drive clutch 3. The controlling lever 41 is then moved to such a position that the operating lever 30 is brought over the desired bell crank lever 34 or 37, as the case may be, and the clutch lever 42 is then permitted to return to its normal position, which is accomplished by the usual clutch spring 63. Operatively connected to the rod 38 is a rod 46, attached at its other end to a second cam 47, which is loosely mounted on shaft 43.

When the direct clutch connection between the driving shaft 2 and driven shaft 12 is to be engaged, the cam 47 is rocked to the right as seen in Fig. 2 about its pivot on shaft 43 to allow the lever 45 to drop down and permit the engagement of clutch 3. The connections between cam 47 and selector member 30 are made such that when clutch 3 is engaged, the selector member is not over any of the bell cranks 34 or 37.

Cam 47 engages a roller 48, mounted on the end of lever 45 to lift the latter and hold out of engagement the direct drive clutch during the operating of any one of the sets of gears. When roller 48 has dropped down over the corner 47ª of cam 47, so as to permit the engagement of clutch 3, the cam 47 cannot be moved and the selector member 30 is thus locked out of all of its brake actuating positions. This interlocking mechanism positively prevents the engagement of two different driving connections between the driving and driven shafts at the same time. The return of the clutch lever 42 to its normal or clutch engaged position, secured by the spring 63, operates to depress the inner end of the lever 30 through the connections 49, 50 and 51, and to thus render operative the selected forward or reverse speed geared, driving connection; or, if desired, to leave all driving connections inoperative if the selector member is in one of its neutral positions, or, if desired, to permit the engagement of the direct-drive clutch 3 for this speed.

In Fig. 7 I have shown diagrammatically a quadrant 65 beneath a controlling lever 41, this quadrant being graduated to indicate the different positions for the controlling lever when the transmission operates on direct drive as well as on the intermediate, low and reverse speeds. It will be seen that there are six positions for the controlling lever, marked respectively D, 2, N, 1, N and R. These letters and figures represent direct drive, intermediate speed, neutral position, low speed, neutral position and reverse, respectively. Corresponding positions are indicated in the same way in Fig. 5. In operating a vehicle having my improved transmission it will ordinarily of course be running with the direct drive engaged and with the controlling lever in the direct position at the lower side of the quadrant 65. In order to engage the second or intermediate speed it is necessary (1) to depress the clutch lever 42, (2) to shift the controlling lever 41 on to the notch marked 2 and (3) to then permit the clutch pedal to return to its normal position. The first action releases the direct drive clutch 3 by means of cam 44 and lever 45. The second action holds the direct drive clutch disengaged by means of the cam 47, and at the same time shifts the selector lever 30 into position above the end of the bell crank lever 34 controlling the drum 19. Upon the third action, permitting the clutch lever 42 to be returned to its normal position, the bell crank lever 34 is depressed by the lever 30 and the band 24 is engaged with the drum 19, which will render operative the intermediate-speed, gear conenction, as already described in these specifications. To shift to another speed the clutch is again depressed and the control lever may then be shifted to the desired position when the clutch is released and on its return movement engages the desired speed. In cranking the motor the control lever can be shifted to either of the neutral positions, which breaks all connections between driving and driven shafts and permits the driving shaft, which of course is connected to the crank shaft of the engine, to be rotated to start the latter.

The present mechanism constitutes an improved transmission means, the control of which is by means of a single lever which is effectively locked to prevent operating at one time of more than one speed. In a sense it is similar to the so-called planetary transmission, although it secures in a very confined space three forward speeds and one reverse, which can not be secured in the usual planetary transmission, which has in the past been used to some extent in motor driven vehicles. It will be obvious that the operation of the clutch bands 23, 24 and 25 may be obtained in various ways and by various means, and if desired electromagnetic devices may be used for the engagement of these clutch bands. If electromagnetic means are employed the form which they would take would preferably be individual solenoids for the different clutch bands, and the current for operating the solenoids may be taken from any suitable source and, if desired, from the slippage current generated in the electromagnetic clutch described and claimed in my United States Patent No. 1,230,175.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a transmission device, the combination of driving and driven gears, a clutch connection between the same normally in engagement, a plurality of gear means between said driving and driven gears, said gear means including permanently meshed gears but being normally inoperative, a clutch lever for disengaging said clutch, yielding means adapted to actuate said lever to normally position the same and engage said clutch, and means adapted to operate one of said gear means upon the normal positioning of said clutch lever, said means being adapted to simultaneously render said clutch connection inoperative.

2. In a transmission device, the combination of driving and driven gears, a clutch connection between the same normally in engagement, a plurality of gear means between said driving and driven gears, said gear means including permanently meshed gears but being normally inoperative, a clutch lever for disengaging said clutch, yielding means adapted to actuate said lever to normally position the same and engage said clutch, controlling means adapted to be selectively positioned relative to said gear means, and means connecting said clutch lever and said controlling means adapted to operate said controlling means to operate the selected one of said gear means upon the normal positioning of said lever.

3. In transmission mechanism, the combination of driving and driven shafts, variable speed, constant-mesh epicyclic gear means interposed therebetween, direct clutching means between said shafts, a clutch lever adapted upon movement to disengage said direct clutching means, a selector lever adapted to select for operation one of said gear means, means operable by said clutch lever and adapted to operate said selected gear means, and connections adapted to render said direct clutching means inoperative upon movement of said selector lever into position to select one of said gear means.

4. In transmission mechanism, the combination of driving and driven shafts, variable speed, constant-mesh gear means interposed therebetween, direct clutching means between said shafts, separate brakes, each adapted to operate one of said gear means, and a single clutch lever adapted to operate all of said gear means and said direct clutching means.

5. In transmission mechanism, the combination of a three-speed epicyclic gear train comprising concentrically mounted driving and driven gears, a concentrically revolving planet shaft carrying two gears in mesh with said driving and driven gears respectively, an internal gear in mesh with one of said gears on said planet shaft, and means adapted to hold said shaft from axial rotation, or said internal gear and driving gear from relative rotation, or to hold said internal gear stationary.

6. In transmission mechanism, the combination of driving and driven shafts, variable speed, constant-mesh epicyclic gear means interposed therebtween, direct clutching means between said shafts, an indicator member adapted by position to preliminarily select either said direct clutching means or one of said variable speed gear means for operation, and operating means adapted to cause said indicator member to operate such selected means.

7. In transmission mechanism, the combination of driving and driven shafts, a plurality of variable speed, constant-mesh gear means interposed betwen said shafts, direct clutching means between said driving and driven shafts, brakes, each adapted to operate one of said gear means, a selector member movable with respect to said other clutches to select one of the same for operation, a pedal adapted to engage and disengage said direct clutch, and means connecting said pedal and selector member, said means being adapted to cause operation of such selected clutch or brake through operation of said selector member.

8. In transmission mechanism, the combination of driving and driven shafts, a plurality of variable speed, constant-mesh gear means interposed between said shafts, direct clutch means between said driving and driven shafts, a plurality of brakes, each adapted to render operative one of said gear means, a selector member movable with respect to said brakes to select one of the same for operation, a pedal adapted to engage and disengage said direct clutch, means connecting said pedal and selector member, said means being adapted to cause operation of such selected clutch or brake through operation of said selector member, and interlocking means adapted to prevent engagement of said direct clutch when said selector member is positioned to cause operation of one of said brakes.

9. In transmission mechanism, the combination of driving and driven shafts, variable speed, constant-mesh epicyclic gear means interposed therebetween, direct clutching means between said shafts, an indicator member adapted by position to preliminarily select either said direct clutching means or one of said variable speed gear means for operation, and an operating member adapted to engage said indicator member and therethrough to render operative such selected gear means.

10. In transmission mechanism, the combination of driving and driven shafts, variable speed, constant-mesh epicyclic gear means interposed therebetween, direct clutching means between said shafts, a clutch lever adapted upon movement to disengage said direct clutching means, a selector lever adapted to select for operation one of said gear means, and means operable by said clutch lever, and adapted to engage said selector lever and therethrough to operate such selected gear means.

11. In power transmission mechanism, a driving and driven shaft, permanently meshed gearing connecting said shafts but being normally inoperative, a clutch connection between said shafts normally in engagement, braking means for operating said gearing, clutch disengaging means, locking means for holding said clutch disengaged, yielding means for returning said clutch disengaging means to clutch engaged position, and means connecting said clutch disengaging means and said braking means whereby said braking means is actuated and said gearing is operated upon the return of said clutch disengaging means to clutch engaged position.

12. In transmission mechanism, the combination of driving and driven means, a plurality of variable speed, constant-mesh gear means interposed therebetween, and a selector member pivoted for movement in one plane to select one of said gear means for operation and pivoted for movement in a second plane to operate such selected gear means.

13. In transmission mechanism, the combination of driving and driven shafts, a plurality of variable speed, constant-mesh gear means interposed therebetween, a plurality of brakes each adapted to operate one of said gear means respectively, and a selector member pivoted in one plane for movement into position to actuate any one of said brakes and pivoted for movement in another plane to actuate the selected one of said brakes.

14. In transmission mechanism, the combination of driving and driven shafts, a plurality of variable speed, constant-mesh gear means interposed therebetween, a plurality of brakes each adapted to operate one of said gear means respectively, said brakes having operative parts positioned adjacent to each other and a selector member pivoted in one plane for movement into position to operate any of the operative parts of said brakes, and pivoted for movement in another plane to actuate the selected one of said brakes.

15. In transmission mechanism, the combination of driving and driven shafts, a plurality of variable speed, constant-mesh gear means interposed therebetween, a plurality of brakes each adapted to operate one of said gear means respectively, and a selector member entirely disconnected from said brakes but pivoted in one plane for movement into position to operate any one of said brakes and pivoted in another plane to actuate the selected one of said brakes.

16. In transmission mechanism, the combination of driving and driven shafts, a plurality of variable speed, constant-mesh gear means interposed therebetween, a selector member pivoted for movement in one plane to select one of said gear means for operation and pivoted for movement in another plane, to operate such selected gear means, an indicator member, means connecting said selector member and said indicator member adapted upon movement of said indicator member to move said selector member about its pivot in one plane into position to operate one of said gear means, and means engaging said selector member adapted to move said selector member about its pivot in the other plane, thereby to operate the selected one of said selected gear means.

17. In transmission mechanism, the combination of driving and driven shafts, a plurality of variable speed, constant-mesh gear means interposed therebetween, a selector member pivoted for movement in one plane to select one of said gear means for operation and pivoted for movement in another plane to operate such selected gear means, an indicator member, means connecting said selector member and said indicator member adapted upon movement of said indicator member to move said selector member about its pivot in one plane to select one of said gear means for operation, and means adapted to move said selector member about its pivot in the other plane to operate such selected gear means.

18. In a power transmission device, a driving and a driven shaft, a normally engaged clutch adapted to connect said shafts, a plurality of epicyclic gear combinations also adapted to connect said shafts but normally inoperative, a lever for disengaging said clutch, actuating means for operating each of said gear combinations, a selector member adapted to select and operate any one of said actuating means, means operative when said clutch is disengaged by said lever to position said selector member and simultaneously render said clutch inoperative, yielding means for returning said lever to normal, clutch-engaged position, and connections between said lever and said selector member adapted upon the normal positioning of said lever to actuate said selector member to render operative the selected actuating means.

19. In transmission mechanism, the combination of a driving and driven gear, direct clutching means adapted to connect said gears and normally maintain the same yieldingly in engagement, variable speed gear means also adapted to connect the gears, but normally out of action, means for disengaging said clutching means, means for putting into action said gear means, and locking mechanism connected to said last-named means whereby said clutching means is rendered inoperative when said gear means is operative and said gear means is inoperative when said clutching means is operative.

20. In transmission mechanism, the combination of two shafts, a normally inactive epicyclic gear train connecting said shafts, a clutch and a brake, said clutch being adapted to directly connect said shafts and said brake being adapted to put into action said epicyclic gear train, means for disengaging said clutch, and a member movable into position to put into engagement said brake, said member being then adapted upon a different movement to actuate said brake.

21. In transmission mechanism, the combination of two shafts, a normally inactive epicyclic gear train connecting said shafts, direct clutching means between said shafts normally in engagement, actuating means for putting into action said epicyclic gear train, clutch disengaging means for said direct clutching means, a member movable into position to operate said actuating means, said member being then adapted upon a different movement to operate said actuating means to put said gear train into action, and means interlocking said member and said clutch disengaging means adapted to render said direct clutching means inoperative when said member is in position to operate said actuating means.

22. In a power transmission mechanism, a driving and a driven shaft, a plurality of epicyclic gear trains between said shafts normally inoperative, a plurality of braking means each adapted to operate one of said gear trains respectively, and a selector member pivoted for movements in two planes adapted upon movement in one plane to select one of said braking means and upon movement in the other plane to actuate said selected braking means thereby to operate one of said gear trains.

23. In a power transmission mechanism, a driving and a driven shaft, an epicyclic gear train between said shafts normally inoperative, braking means adapted to operate said gear train, and a selector member pivoted for movements in two planes, adapted upon movement in one of said planes to come into position to actuate said braking means and upon movement in the other of said planes to actuate said braking means thereby to operate said gear train.

24. In transmission mechanism, the combination of an epicyclic gear train, brakes adapted to restrain from rotation the several elements of said train to produce different speed ratios between driving and driven members, pivoted levers connected to said brakes for operating the same, said levers having their ends arranged adjacent each other, and a selector lever pivoted for movement in one plane to preliminarily select one of said brakes for operation and pivoted for movement in another plane to operate the selected brake thereby to operate said epicyclic gear train.

25. In transmission mechanism, the combination of two shafts, a two-speed, epicyclic gear train connecting said shafts, two brakes arranged adjacent each other and adapted to operate the two speeds of said epicyclic train, and a member pivoted for movement in one plane into position adjacent either of said brakes, and pivoted for movement in another plane to engage and operate such selected one of said brakes.

26. In transmission mechanism, the combination of driving and driven shafts, a plurality of variable speed, constant-mesh gear means interposed therebetween, a plurality of brakes, each adapted to operate one of said gear means respectively, and a selector member pivoted for movement in one plane into position to operate any one of said brakes or into neutral positions between such brake operating positions, said member being also pivoted for movement in a different plane to actuate the selected one of said brakes.

27. In transmission mechanism, the combination of two shafts, a friction clutch adapted to operatively connect said shafts, yielding means for operating said friction clutch, epicyclic gearing interposed between and connected to said shafts, brakes adapted to engage and control the operation of said epicyclic gearing, a member pivoted in one plane to select one of said brakes for operation, and means connected to said friction clutch operating means adapted upon movement of the same to operate such selected brake.

28. In transmission mechanism, the combination of two shafts, a clutch adapted to operatively connect said two shafts, epicyclic gearing interposed between and connected to said shafts, braking means adapted to engage and control the operation of said epicyclic gearing, a manually operable selector member movable in one plane into position to operate said braking means, means adapted to move said selector member in another plane to operate such selected braking means and interlocking means adapted to prevent engagement of said clutch upon operation of said braking means.

29. In transmission mechanism, the combination of a three-speed epicyclic gear train comprising concentrically mounted driving and driven gears, a concentrically revolving planet shaft carrying two gears in mesh with said driving and driven gears, respectively, an internal gear in mesh with one of said gears on said planet shaft, means for holding said planet shaft from rotation about the axis of the gear train, means for holding said internal gear and planet shaft from rotation about said driving and driven gears, and means for holding said internal gear alone from rotation about its own axis.

30. In a transmission device, the combination of driving and driven gears, a clutch connection between the same normally in engagement, a plurality of gear means between said driving and driven gears, said means including permanently meshed gears but being normally inoperative, resilient means adapted to cause the actuation of said gear means, and means connected with said yielding means adapted to restrain said clutch from operation during the actuation of said gear means.

31. In a transmission device, the combination of driving and driven gears, a clutch connection between the same normally in engagement, a plurality of gear means between said driving and driven gears, said means including permanently meshed gears but being normally inoperative, clutch disengaging means, a selector member operable by said clutch disengaging means for actuating any one of said gear means, and controlling means adapted to position said selector member for the actuation of any one of said gear means.

32. In transmission mechanism, the combination of driving and driven shafts, variable speed, epicyclic gear means interposed therebetween, direct clutching means between said shafts, separate brakes, each respectively adapted to render operative one of the speeds of said gear means, and resilient means adapted to actuate any of said brakes and said direct clutching means.

33. In transmission mechanism, the combination of a three-speed epicyclic gear train comprising concentrically mounted driving and driven gears, a concentrically revolving planet shaft carrying two gears in mesh with said driving and driven gears, respectively, an internal gear in mesh with one of said gears on said planet shaft, and resiliently actuated means adapted either to hold said planet shaft from axial rotation, said internal gear and driving gear from relative rotation, or to hold said internal gear stationary.

34. In power transmission mechanism, a driving and a driven gear, normally inoperative, permanently meshed, variable speed gearing connecting said driving and driven gears, a normally engaged clutch also connecting said driving and driven gears, actuating means for rendering each of the various speeds of said gearing operative, clutch disengaging means, means operated by the return of said clutch disengaging means to clutch engaged position for operating said actuating means, and means adapted to hold said clutch disengaged when said gearing is actuated.

35. In power transmission mechanism, a driving and a driven shaft, epicyclic gearing adapted to connect said shafts, direct clutching means also adapted to connect said shafts, yielding means normally holding said clutching means in engagement, means for operating said gear means, a disengaging member adapted to simultaneously release both of said means, and locking means connected to said gear operating means for holding said clutching means disengaged when said gear means is operated.

36. In power transmission mechanism, a driving and a driven shaft, epicyclic gearing adapted to connect said shafts, a clutch also adapted to connect said shafts, clutch disengaging means, locking means adapted to hold said clutch disengaged, a member adapted to operate said gearing, and means connecting said member and said clutch disengaging means whereby said gearing is actuated upon the return of said clutch disengaging means to clutch engaged position, said clutch being at such time held out of engagement by said locking means.

37. In a vehicle transmission, the combination of a driving shaft, a driven shaft, a plurality of normally inoperative gearing elements therebetween, separate means for rendering each of said gearing elements operative, and a selector member pivoted for movement in one plane to select one of said means for operation and pivoted for movement in another plane to operate such selected means, thereby to render operative one of said gearing elements.

38. In transmission mechanism, the combination of driving and driven shafts, a plurality of variable speed gearing interposed therebetween, a direct clutch adapted to connect said shafts, braking means adapted to place in action said variable speed gearing to connect said shafts, and a mechanism adapted to operate either said direct clutch or said braking means, said mechanism being normally disconnected from said braking means.

39. In transmission mechanism, the combination of driving and driven shafts, a plurality of variable speed gearing interposed therebetween, a direct clutch adapted to connect said shafts, said clutch being shiftable axially of said shafts into engagement, braking means adapted to place in action said variable speed gearing to connect said shafts, and a mechanism adapted to shift said direct clutch into engagement or operate said braking means, said mechanism being normally disconnected from said braking means.

40. In transmission mechanism, the combination of driving and driven shafts, a plurality of variable speed gearing interposed therebetween, a direct clutch adapted to connect said shafts, said clutch being shiftable axially of said shafts into engagement, braking means adapted to place in action said variable speed gearing to connect said shafts, and a mechanism adapted to shift said direct clutch into engagement or operate said braking means, said mechanism being normally disconnected from said braking means, said mechanism embodying means adapted to hold said direct clutch disengaged while said mechanism is operating said braking means.

41. In transmission mechanism, the combination of driving and driven shafts, a plurality of variable speed gearing interposed therebetween, a direct clutch adapted to connect said shafts, said clutch being shiftable axially of said shafts into engagement, braking means adapted to place in action said variable speed gearing to connect said shafts, and a member adapted to shift said direct clutch into engagement or operate said braking means, said mechanism being normally disconnected from said braking means, said mechanism embodying means adapted to hold said direct clutch disengaged during the entire operation of said braking means.

42. In transmission mechanism, the combination of driving and driven shafts, a plurality of variable speed gearing interposed therebetween, a direct clutch adapted to connect said shafts, braking means adapted to place in action said variable speed gearing to connect said shafts, a plurality of actuating means adapted to operate said direct clutch and variable speed gearing, said means being positioned adjacent each other and there being a neutral point between said means, and a member adapted to operate any one of said actuating means or to be positioned at said neutral point.

43. In transmission mechanism, the combination of driving and driven shafts, variable speed, constant-mesh gear means interposed therebetween, direct clutching means between said shafts, an indicator member adapted by position to preliminarily select either said direct clutching means or one of said variable speed gear means for operation, and operating means adapted to cause said indicator member to render operative such selected means.

44. In transmission mechanism, the combination of two shafts, a clutch means adapted to operatively connect said two shafts, epicyclic gearing interposed between and connected to said shafts, braking means adapted to engage and control the operation of said epicyclic gearing, a member movable manually in one plane to select one of said means for operation, and resilient means adapted to operate said member in another plane to operate such selected braking means.

45. In transmission mechanism, the combination of driving and driven shafts, gearing interposed therebetween, a clutch adapted to connect said driving and driven shafts, braking means adapted to operate said gearing, and mechanism adapted to operate either said clutch or said braking means, said mechanism being mounted and connected to said clutch and means to cause such operation during one way movement over a single path of travel.

46. In transmission mechanism, the combination of driving and driven shafts, epicyclic gearing interposed therebetween, gearing operating means adapted to put into action said epicyclic gearing, a clutch adapted to connect said shafts, a clutch shifter adapted to operate said clutch, and mechanism including means adapted to engage either said gearing operating means or said clutch shifter, said mechanism being adapted to then actuate such engaged means or clutch shifter during a one-way movement over the same path of travel.

Signed by me, this 14th day of November, 1917.

CYRUS B. KURTZ.